United States Patent
Zhao et al.

(10) Patent No.: US 9,288,763 B1
(45) Date of Patent: Mar. 15, 2016

(54) BATTERY CONSUMPTION MONITORING

(71) Applicant: Cisco Technology, Inc., San Jose, CA (US)

(72) Inventors: Qiujun Zhao, Hangzhou (CN); Robin You, Hangzhou (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/488,322

(22) Filed: Sep. 17, 2014

(30) Foreign Application Priority Data

Sep. 2, 2014 (CN) .......................... 2014 1 0444116

(51) Int. Cl.
*H04M 1/00* (2006.01)
*H04W 52/02* (2009.01)
*H04W 68/00* (2009.01)

(52) U.S. Cl.
CPC ...... *H04W 52/0261* (2013.01); *H04W 52/0251* (2013.01); *H04W 68/005* (2013.01)

(58) Field of Classification Search
None
See application file for complete search history.

(56) References Cited

U.S. PATENT DOCUMENTS

| | | | | |
|---|---|---|---|---|
| 2011/0040996 A1* | 2/2011 | Hackborn | ............ | G06F 11/3409 713/340 |
| 2013/0119998 A1* | 5/2013 | Roh | ...................... | G01N 27/416 324/427 |
| 2014/0095091 A1* | 4/2014 | Moore | ...................... | H04Q 9/00 702/63 |
| 2014/0257695 A1* | 9/2014 | Annapureddy | ........ | G01C 21/00 701/537 |

OTHER PUBLICATIONS

Ravi, Nishkam; "Context-Aware-Battery-Management-For-Mobile-Phones" (10 pages), Pervasive Computing and Communications, 2008. PerCom 2008. Sixth Annual IEEE International Conference on , vol., no., pp. 224,233, Mar. 17-21, 2008.

Yap, Han Lin; "Battery Time Remaining"; 2014 (3 pages); as found at: https://itunes.apple.com/us/app/battery-time-remaining/id551420833?mt=12.

Cheetah Mobile Inc., Battery Doctor (Battery Saver)—Sep. 2014 (2 pages) as found at: https://play.google.com/store/apps/details?id=com.ijinshan.kbatterydoctor_en&hl=en.

Xie, Yufeng; "Dynamic Priority Assignment Based Task Scheduling for Battery-Powered Portable Systems", ASIC, 2007. ASICON '07. 7th International Conference on , vol., no., pp. 209,212, Oct. 22-25, 2007 (4 pages).

Berenz, Vincent; "Risk and Gain Battery Management for Self-Docking Mobile Robots", Robotics and Biomimetics (ROBIO), 2011 IEEE International Conference on , vol., no., pp. 1766,1771, Dec. 7-11, 2011 (6 pages).

(Continued)

*Primary Examiner* — Edward Urban
*Assistant Examiner* — Mohammed Rachedine
(74) *Attorney, Agent, or Firm* — Samuel M. Katz

(57) ABSTRACT

In one embodiment, a method for battery monitoring on a computing device includes: estimating a battery consumption estimate for an event scheduled on the computing device, checking a battery charge level prior to said scheduled event, determining according to a set of battery notification rules whether or not to provide a battery warning notification on the computing device, where the determining is based at least on the battery consumption estimate and the checking, and providing the battery warning notification if required in accordance with the determining.

13 Claims, 8 Drawing Sheets

(56) References Cited

OTHER PUBLICATIONS

Cho, Jungwook; "A Battery Lifetime Guarantee Scheme for Selective Applications in Smart Mobile Devices", Consumer Electronics, IEEE Transactions on , vol. 60, No. 1, pp. 155,163, Feb. 2014 (9 pages).

Ragsdale, Matthew; "A Novel Battery Identification Method Based on Pattern Recognition," Vehicle Power and Propulsion Conference, 2008. VPPC '08. IEEE , vol., no., pp. 1,6, Sep. 3-5, 2008 (6 pages).

\* cited by examiner

| MEETING 1 (1 HOUR) | | | MEETING 2 (1.5 HOUR) | | | MEETING n (2 HOURS) | | |
| --- | --- | --- | --- | --- | --- | --- | --- | --- |
| USER | DEVICE | BATTERY CONSUMPTION | USER | DEVICE | BATTERY CONSUMPTION | USER | DEVICE | BATTERY CONSUMPTION |
| USER 1 | IPHONE 5 | 19% | USER a | lumia 925 | 31% | USER A | IPHONE 5S | 43% |
| USER 2 | IPAD MINI | 10% | USER b | IPHONE 5 | 38% | USER B | SUFACE RT | 8% |
| USER 3 | HTC C620E | 22% | USER c | MOTO X | 19% | USER C | IPHONE 5 | 44% |
| USER 4 | IPHONE 5 | 24% | USER d | HTC ONE | 26% | USER D | HTC C620E | 41% |
| USER 5 | IPAD 4 | 7% | USER e | NAXUS 5 | 22% | USER E | THINKPAD 8 | 13% |
| USER 6 | GALAXY NOTE 2 | 18% | USER f | GALAXY NOTE 2 | 27% | USER F | HTC ONE | 39% |
| ... | ... | ... | ... | ... | ... | ... | ... | ... |
| USER n | GALAXY NOTE 2 | 18% | USER n | IPAD 3 | 9% | USER N | IPHONE 5 | 41% |

FIG. 4

BATTERY CONSUMPTION MONITORING

FIELD OF THE INVENTION

The present invention generally relates to predicting battery consumption for mobile computing devices, and particularly, but not exclusively, to monitoring battery consumption for scheduled tasks/events.

CROSS REFERENCE

The present application claims the benefit of priority from CN Patent Application CN 201410444116.4 of Cisco Technology, Inc., filed Sep. 2, 2014.

BACKGROUND OF THE INVENTION

Mobile computing devices such as laptops, tablets and smartphones, are typically configured with batteries to enable them to operate without being connected to an external power source. Such devices are typically operative to provide feedback regarding current battery levels and/or to provide a warning when the battery level is below a certain threshold. Some devices are also operative to enter a power saving mode of operation to limit battery usage when the battery level is below a certain threshold.

BRIEF DESCRIPTION OF THE DRAWINGS

The present invention will be understood and appreciated more fully from the following detailed description, taken in conjunction with the drawings in which:

FIGS. 4 and 5 are exemplary data tables to be used by the process of FIG. 3;

DESCRIPTION OF EXAMPLE EMBODIMENTS

Overview

A method for battery monitoring on a computing device includes: estimating a battery consumption estimate for an event scheduled on the computing device, checking a battery charge level prior to said scheduled event, determining according to a set of battery notification rules whether or not to provide a battery warning notification on the computing device, where the determining is based at least on the battery consumption estimate and the checking, and providing the battery warning notification if required in accordance with the determining.

A method for monitoring battery charge on a computing device includes: estimating a battery consumption estimate for an event on the computing device, checking a battery charge level during the event, determining according to a set of battery notification rules whether or not to provide a battery warning notification on the computing device, where the determining is based at least on results of the estimating and the checking, and providing the battery warning notification if required in accordance with the determining.

DETAILED DESCRIPTION OF EXAMPLE EMBODIMENTS

The services provided by mobile computing devices such as, for example, smartphones, tablets and computer laptops, are generally limited by the capacity of their batteries. Accordingly, a common concern of mobile computing device users is to ensure that the batteries of their devices do not run out when they need/plan to use them as mobile devices, without connection to an external power source.

Such devices are typically configured to monitor battery levels and provide an alert when the battery level is below a certain threshold, such as, for example, 15% of full capacity. However, such alerts are typically provided in a reactive fashion, once the battery is already close to empty. If such an alert is received when an external power is not available, it may be necessary to shut down the device or at least limit its use in order to conserve battery power. This may be particularly problematic when a user otherwise intends to use the mobile computing device to participate in a scheduled event, such as, for example, a video conference or phone call. The inventors of the present invention has realized that a user's scheduled events may be leveraged to proactively predict battery usage and therefore enable prediction of whether or not a mobile computing device is likely to have enough stored charge to perform a scheduled task.

Figure 1A:
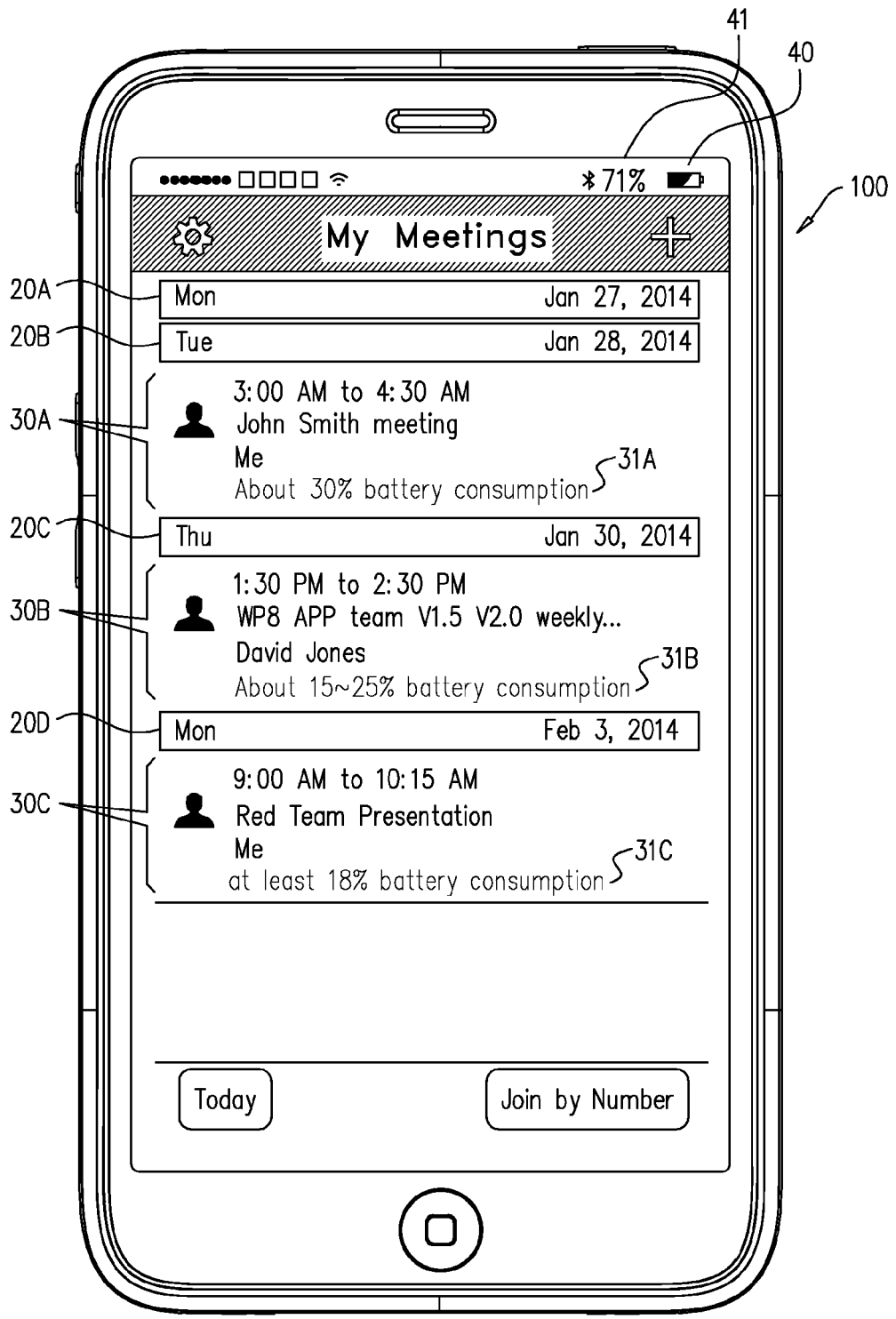
FIGS. 1A and 1B are simplified pictorial illustrations of mobile computing devices, constructed and operative in accordance with embodiments of the present invention.

Reference is now made to FIG. 1A which illustrates an exemplary mobile computing device 100, constructed and operative in accordance with embodiments of the present invention. It will be appreciated by one of skill in the art, that the depiction of mobile computing device 100 as a smartphone in FIG. 1A may be exemplary; the present invention may also support the use of other mobile computing devices such as, for example, a laptop computer or a tablet computer.

Mobile computing device 100 may comprise battery icon 40 and battery percentage indicator 41. Battery icon 40 may be a graphic representation of the current battery level in device 100, and may be supported by standard built-in functionality in device 100. Battery percentage indicator 41 may represent the current battery level as a percentage, for example: 71%, as in FIG. 1A.

As illustrated in FIG. 1A, device 100 is operative to display a meeting scheduler application comprising meeting entries 20 which indicate meetings that may have already been scheduled. Meeting entries 20 may be expandable to show meeting details 30 for the associated date entry. For example, per FIG. 1A, meeting entry 20A may indicate that a meeting has been scheduled for Monday, Jan. 27, 2014. Meeting entry 20B may have been expanded to show meeting details 30A which indicate a meeting with John Smith and hosted by "me", taking place on Jan. 28, 2014 (per meeting entry 20B) from 3:00 AM to 4:30 AM. Meeting entries 20C and 20D are similarly expanded to reveal meeting details 30B and 30C.

In accordance with embodiments of the present invention, meeting details 30 also comprise battery estimates 31 that may provide an estimate of how much battery power may be necessary to conduct the associated meeting. For example, per battery estimate 31A, the one and a half hour meeting scheduled for meeting entry 20B may be expected to consume approximately 30% of a full charge of the battery in device 10A. Similarly, per battery estimates 31B and 31C, the meetings associated with meeting entries 20C and 20D may be expected to use 15-25% and at least 18%, respectively.

Figure 1B:
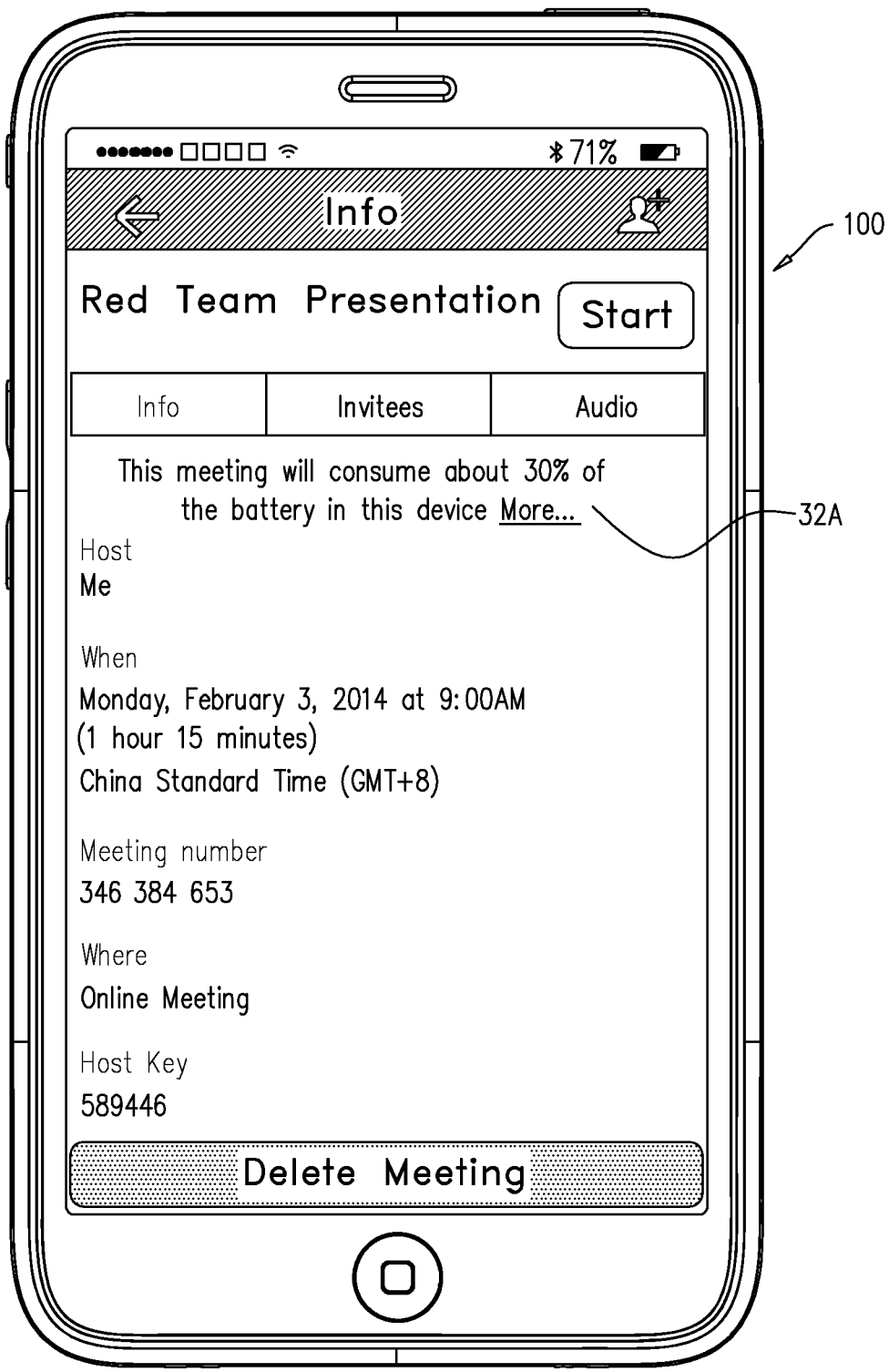

It will be appreciated that a meeting scheduler application may be operative to present different levels of detail. FIG. 1B, to which reference is now made, depicts mobile computing device 100 with a lower level view of meeting entry 20D as presented in FIG. 1A. It will be appreciated that in such a lower level view, more information and/or options may be presented. For example, detailed battery estimate 32A may provide a lengthened version of the estimate provided by battery estimate 31C, with an option to receive additional battery estimate details by clicking on "more".

Figure 2:
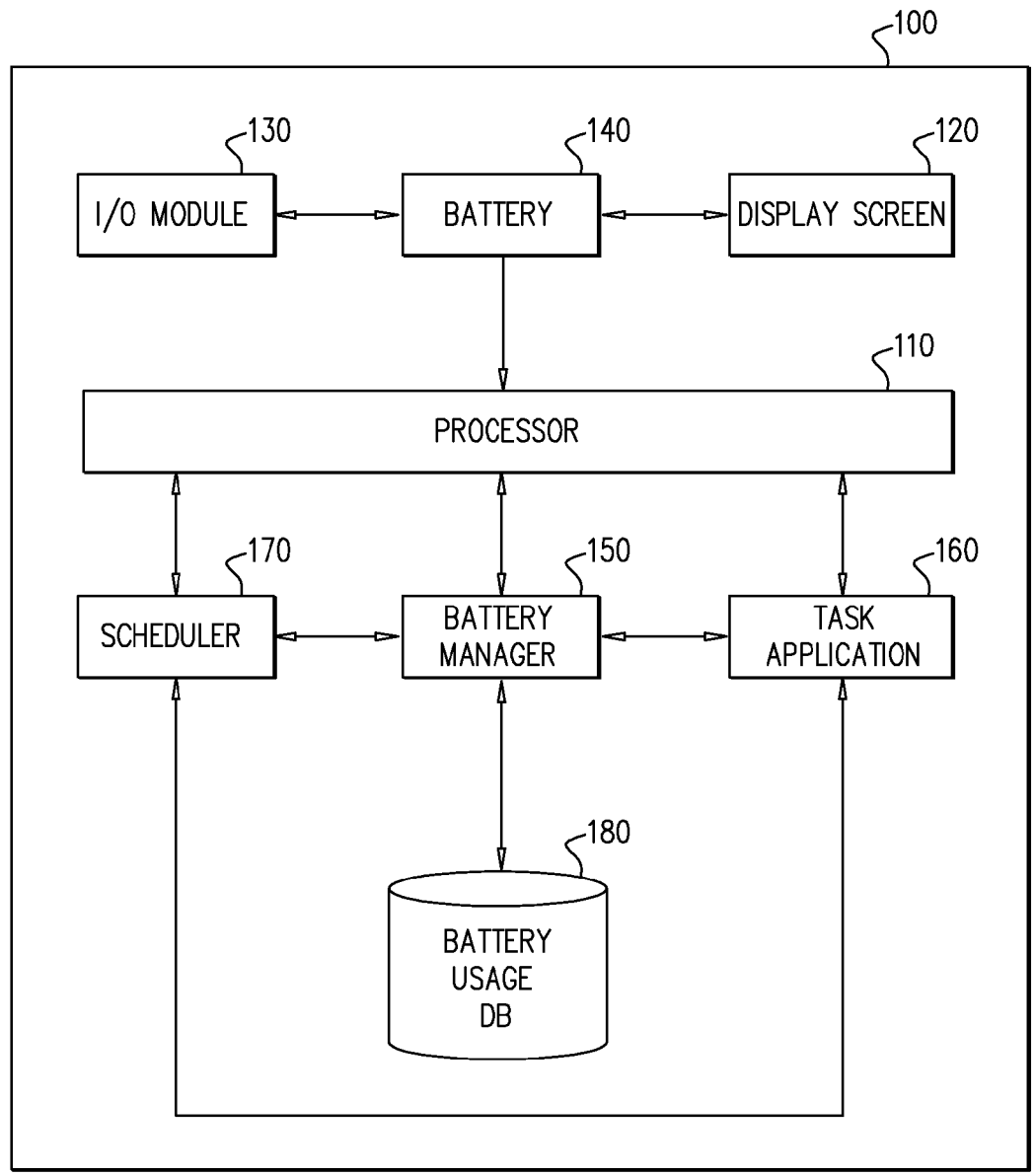
FIG. 2 is a simplified pictorial illustration of an exemplary computing device, constructed and operative in accordance with an embodiment of the present invention.

Reference is made to FIG. 2, which is a block diagram drawing of exemplary mobile computing device 100. As discussed hereinabove, mobile computing device 100 may be any suitable mobile computing device operative to monitor battery levels. For example, mobile computing device may be a smartphone, a tablet computer, or a laptop computer, etc. Mobile computing device 100 comprises: at least one processor 110; display screen 120; I/O module 130; battery 140; battery manager 150, task application 160, scheduler 170 and battery usage database 180. It will be appreciated that mobile computing device 100 comprises hardware and software components, such as are well-known in the art. It will similarly be appreciated that mobile computing device 100 may comprise other components that are not depicted in FIG. 1.

It will be appreciated that mobile computing device 100 may comprise more than one processor 110. For example, one such processor 110 may be a special purpose processor operative to execute battery manager 150 to monitor the usage of battery 140 and to provide battery consumption estimates based at least in part on usage statistics stored in battery usage database 180.

It will be appreciated that battery manager 150 may be an application implemented in software and/or hardware on mobile computing device 100. Task application 160 may be any suitable application installed on mobile computing device 100 that may be scheduled to perform a scheduled task. Non limiting examples of such a scheduled task may include video conferences, audio conferences, telephone calls, media content playing, etc. Scheduler 170 may be any suitable application installed on mobile computing device 100 that may be operative to schedule tasks performed by task application 160. It will be appreciated task application 160 and scheduler 170 may be implemented in software and/or hardware on mobile computing device 100. It will similarly be appreciated that the depiction of battery manager 150, task application 160 and scheduler 170 as separate and distinct entities may be exemplary. The present invention may also support the integration of some or all of the functionality of battery manager 150 as part of task application 160 and/or scheduler 170. Similarly, some or all of the elements of task application 160 may be integrated as part of scheduler 170. Likewise, some or all of the elements of scheduler 170 may be integrated as part of task application 160.

Display screen 120 may be a display screen operative to display views generated by applications such as, for example, battery manager 150, task application 160 and scheduler 170, and/or the operating system (not shown) of mobile computing device 100. I/O module 130 may be a software or hardware component such as, for example, a transceiver, operative to transmit and receive data at least in support of battery manager 150, task application 160 and scheduler 170.

Figure 3:
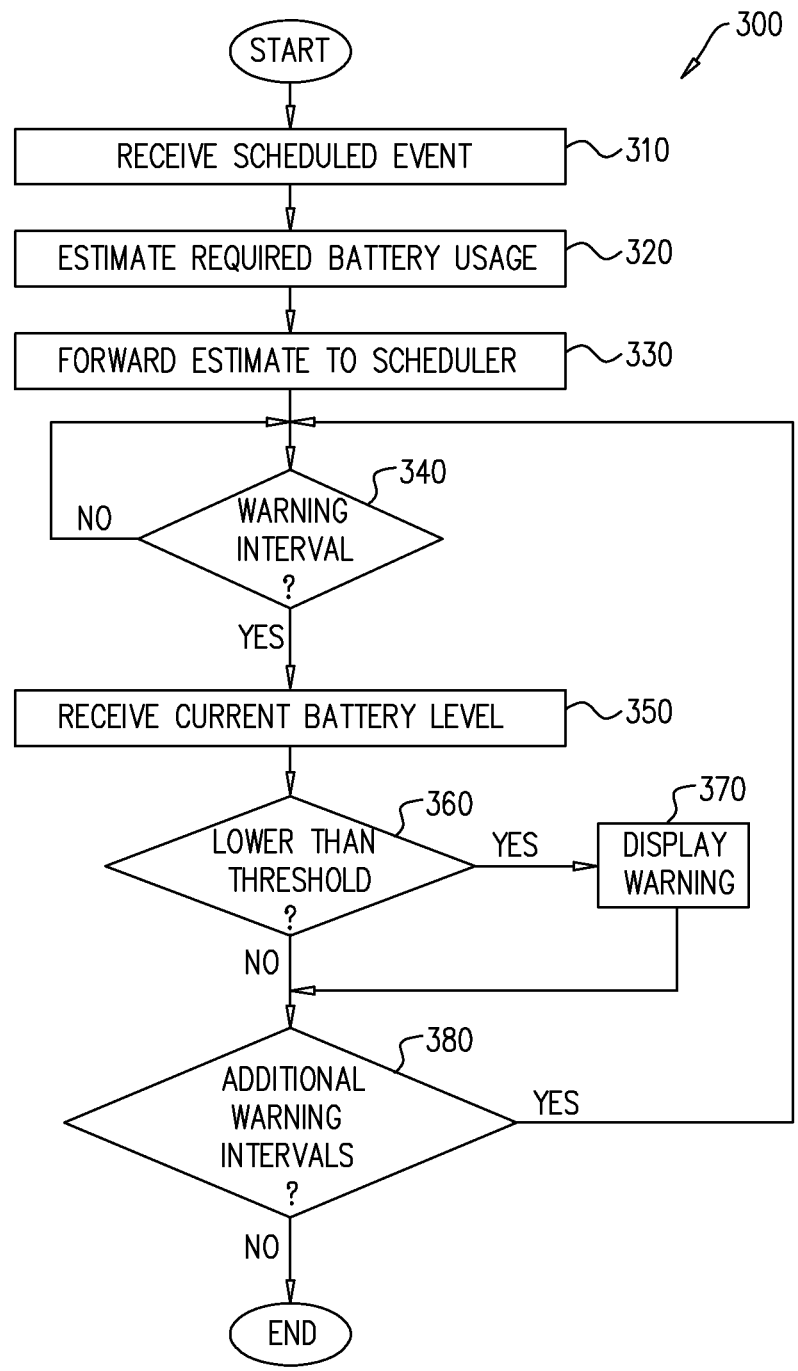
FIG. 3 is a block diagram of a battery consumption monitoring process to be performed on the computing device of FIG. 2.

Reference is now also made to FIG. 3, which illustrates a battery consumption monitoring process 300 to be performed by battery manager 150 in accordance with embodiments of the present invention. Battery manager 150 may receive (step 310) details of a scheduled event from scheduler 170. An exemplary such scheduled event may require tasks to be performed by task application 160. For example, the scheduled event may be a meeting such as one of the meetings described by meeting entries 20 (FIG. 1A). In such a case, the event details received in step 310 may at least include the expected length of the meeting, or at least an indication of the expected length. For example, start and stop times such as, for example 1:30 PM and 2:30 PM respectively per meeting details 30B (FIG. 1A) may yield an expected length of one hour.

Another example of a scheduled event may be a broadcast event, where task application 160 may be a media player scheduled to receive and play a broadcast at a given time. It will be appreciated by one of skill in the art that any task scheduled by scheduler 170 to be performed on device 100 may represent a scheduled event within the context of the present invention. Accordingly, a scheduled event may not necessarily require scheduling vis-à-vis a second party such as another meeting participant or media broadcaster as per the above examples. A scheduled event may represent a scheduled task to be performed solely by the user of device 100. For example, the user may use scheduler 170 to schedule time to read an eBook, where task application 160 may be a document reader application. The user may similarly schedule time to browse the Internet, where task application 160 may be a mobile web browser.

Battery manager 150 may estimate (step 320) the required battery usage as per the meeting details received in step 310, i.e. per the above example where the scheduled event is a meeting, battery manager may estimate the expected battery usage for a one hour meeting. In accordance with embodiments of the present invention, such estimation may be based on observed battery usage by mobile computing device 100 and/or similar such devices.

Reference is now made to FIG. 4 which illustrates an exemplary meeting/battery usage table 400. Meeting/battery usage table 400 may comprise a multiplicity of usage observations 410, wherein observations 410 may detail observations of battery usage for actual scheduled tasks as performed by task application 160 on various different types of mobile computing devices 100. For example, meeting/battery usage table 400 may be based on observation of battery usage by a task application 160 for conducting online meetings. Observation 410A may comprise the details of the battery usage of devices that were used to participate in an exemplary one hour meeting; observation 410B may comprise the details of the battery usage of devices participating in an exemplary one and a half hour meeting; observation 410$n$ may comprise the details of a two hour meeting. It will be appreciated by one of skill in the art that the generation of similar such tables for each type of task application 160 may be supported by the present invention. Battery manager 150 may use the observations in the meeting/battery usage table to estimate the expected battery usage per the meeting details received from scheduler 170.

For example, mobile computing device 100 may be an iPhone 5®, and the scheduled event for which details were received in step 310 may be an online meeting such as that referenced by meeting/battery usage table 400. There are five entries for an iPhone 5 in meeting/battery usage table 400 (users 1 and 4 in observation 410A; user b in observation 410B, and users C and N in observation 410N). Accordingly, battery manager 150 may compute the average battery consumption for an online meeting on an iPhone 5 as:

(19%+24%+38%/1.5+44%/2+41%/2)/5=22.17% per hour.

Furthermore, the minimum observed battery consumption may have been 19% per hour, and the maximum battery consumption may have been 24% per hour. Battery manager 150 may be configured to provide a battery usage estimate based on the average battery consumption. Battery manager 150 may also be configured to provide a safety margin to the estimate to prevent total battery drainage during usage. For example, the estimate may be adjusted by adding an additional percentage, e.g. 2% or 5%. Alternatively, or in addition, the estimate may be adjusted in light of the maximum observed battery consumption, i.e. 24% per meeting/battery usage table 400.

It will be appreciated by one of skill in the art that meeting/battery usage table 400 may have been compiled by a distributor of battery manager 150. In practice, such a table may be summarized prior to storage in battery usage database 180 in order to increase the efficiency of step 320. For example, the installation process of battery manager 150 and/or battery usage database 180 may include designation of the manufacturer and model of mobile computing device 100, such that it may be sufficient to provide battery usage data for the specific model of device 100, i.e. for an iPhone 5 as per the example hereinabove. It will also be appreciated that the format and usage of meeting/battery usage table 400 is exemplary; the present invention may support any suitable format and/or method for documenting actual battery usage and the use thereof for estimating battery requirements for future scheduled tasks.

It will similarly be appreciated by one of skill in the art that batteries of the same model of mobile computing device 100 may not always perform similarly. Battery performance may also tend to degrade over time. It will accordingly be appreciated that the present invention may also support the compilation of meeting/battery usage data based on actual meetings conducted by task application 160 on mobile computing device 100. This data may be added to meeting/battery usage table 400 in order to further calibrate estimates provided by battery manager 150 in light of actual usage on device 100. Alternatively, such data may be used to replace meeting/battery usage table 400.

It will be appreciated by one of skill in the art that actual meeting/battery usage data may be derived using known application programming interfaces (APIs) to check current battery levels of battery 140 at the beginning and end of meetings on mobile computing device 100. For example, for Android deices, suitable APIs for monitoring battery levels may be found at http://developer.android.com/training/monitoring-device-state/battery-monitoring.html. A suitable API for iOS devices may be found at https://developer.apple.com/library/ios/documentation/uikit/reference/UIDevice_C lass/Reference/UIDevice.html. It will be appreciated that these APIs may also be used when preparing meeting/battery usage table 400.

Returning to FIG. 3, battery manager may forward (step 330) the estimate of expected battery consumption to scheduler 170. It will be appreciated that scheduler 170 may include the estimate in meeting details 30 as shown in FIG. 1A. It will similarly be appreciated that the syntax and representation of the estimate in meeting details 30 may be configurable.

It will be appreciated that events may be scheduled in scheduler 170 days, weeks or even months in advance. Accordingly, the current level of battery 140 at the time of the scheduling of the associated event may not be a reliable indicator of an anticipated ability for device 100 to sustain power for the event when it actually occurs; battery 140 may undergo repeated power up/power down cycles between the scheduling of an event and the time at which the event actually occurs. It may not be relevant to monitor battery 140 with regard to the scheduled event until a defined interval of time prior to the scheduled event.

Accordingly, battery manager 150 may be configured with a series of warning intervals intended to detect low battery levels in advance of the scheduled event in order to provide sufficient advance notice that the situation may be remedied in time. For example, battery manager 150 may be configured to start checking the battery level of battery 140 three hours before a given scheduled event, with hourly warning intervals thereafter until the event starts. It will be appreciated that a configuration with a three hour start with hourly intervals is exemplary; the present invention may support other start/interval schemes as well.

Figure 5:
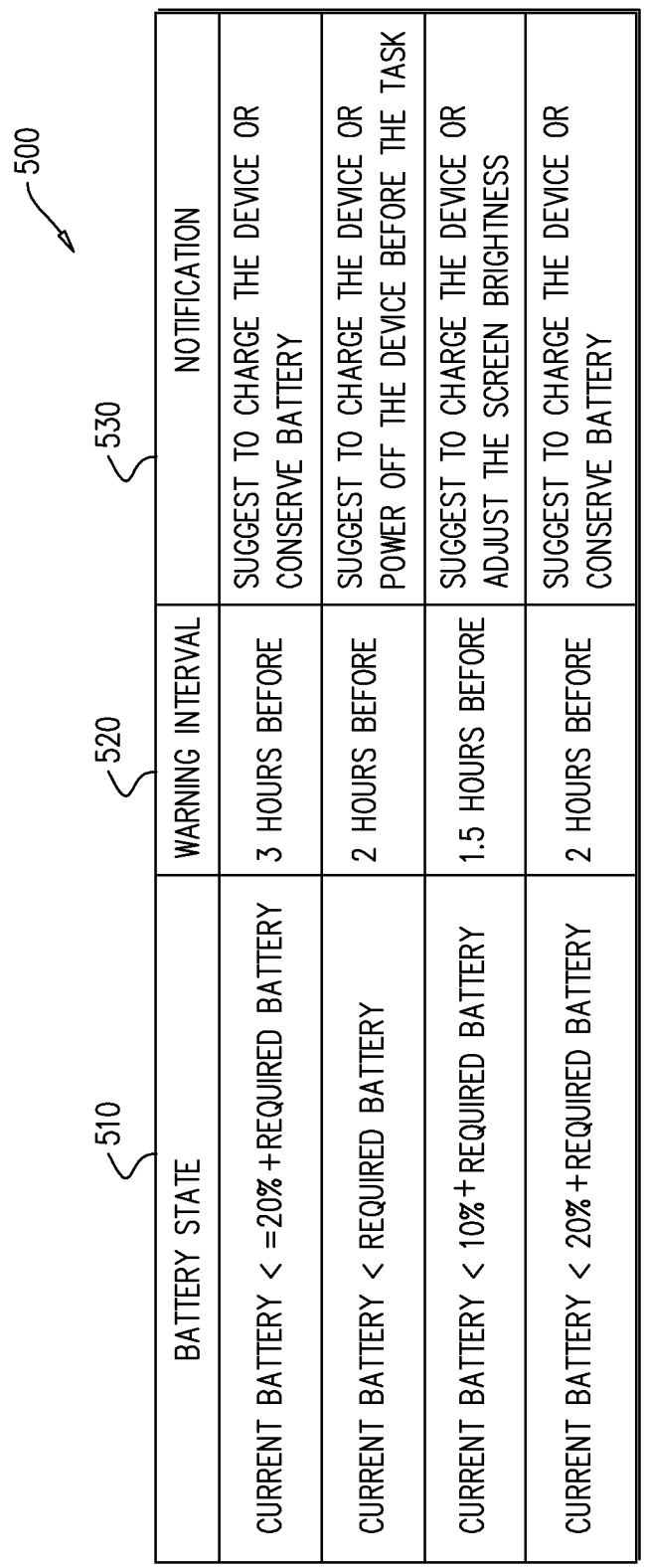

Battery manager 150 may therefore effectively enter a wait state until a warning interval occurs (step 340). For example, battery manager 150 may be configured such that the first warning interval may be three hours before the scheduled event. Battery manager may then receive (step 350) the current battery level of mobile computing device 100 using, for example, the APIs discussed hereinabove. Reference is now also made to FIG. 5 which illustrates an exemplary battery warning notification rules table 500 to be used by process 300 to determine which, if any, warning to display on mobile computing device 100 in response to the battery level received in step 350.

Battery warning notification rules table 500 comprises a set of rules used by battery manager 150 to determine whether or not a battery warning notification should be provided to mobile computing device 100. The rules in table 500 are comprised of battery states 510, warning intervals 520 and notifications 530. Battery state 510 may refer to possible states of battery 140 and may be a function of three factors: the current battery level, a required battery charge level (i.e. as may be determined in step 330) and an additional reserve battery percentage that may be used by device 100 prior to the scheduled event. Each battery state 510 is associated with at least one warning interval 520. It will be appreciated by one of skill in the art that battery warning notification rules table 500 may be configured by the provider of device 100 and/or battery manager 150. Battery warning notification rules table 500 may also be configured and/or modified by the user of device 100.

As depicted in FIG. 5, the earliest warning interval in battery warning notification rules table 500 may be "three hours before". Accordingly, per the entry in table 500, step 340 may return "Yes" three hours before the scheduled event. Battery manager 150 may then receive (step 350) the current battery level using known APIs as discussed hereinabove.

As shown in table 500, an exemplary battery state 510 associated with the "three hour before" warning interval 520 may be "current battery level<=20%+required battery level." If this state is true (step 360), i.e. the current level received in step 350 plus an additional 20% is less than or equal to the estimate derived in step 320, battery manager 150 may issue a warning to be displayed (step 370) on display screen 120 (FIG. 2). For example, if an exemplary estimate derived in step 320 was 25%, step 360 may test whether battery 140 has at least a 45% charge, i.e. whether the current charge level is sufficient for both the estimate (i.e. 25%), plus an additional 20% that may be, for example, intended to support regular operations of mobile computing device 100 at least until the scheduled event. Accordingly, if the current charge level as received in step 350 is less than 45%, battery manager 150 may display a warning on display screen 120 per the associated notification 530. Assuming that the current time is 9:00

AM such that a scheduled meeting "X" is three hours later at 12:00 PM, battery manager 150 may display a popup warning such as, for example, "Meeting X is scheduled for 12:00 PM. Please charge the device or conserve battery function in order to ensure full functionality."

As depicted in battery warning notification rules table 500, there may be multiple warning intervals 520 defined, i.e. battery manager 150 may be configured to provide additional warnings as a meeting approaches. If there are additional warning intervals 520 defined before the meeting (step 380), control may flow back to step 340 where process 300 may continue when the next warning interval 520 occurs. For example, as shown in table 500, a next warning interval 520 may be defined for two hours before the meeting. If there are no additional warning intervals 520 before the meeting, process 300 may end.

It will be appreciated that there may be more than one possible battery state 510 to be tested for a given warning interval 520. For example, as depicted in table 500, there may be two battery states 510 associated with a warning interval 520 of "two hours before". Battery manager 150 may be configured to test battery states 510 until the result returned by step 360 is "YES", i.e. until the condition defined by a given battery state 510 is true.

For example, battery manager 150 may first test for the condition "current battery<required battery." If such a condition is true (step 360), battery manager 150 may display a popup warning such as, for example, "Meeting X is scheduled for 12:00 PM. Please charge the device or turn it off now in order to ensure full functionality." If the condition of battery state 510 is not met, i.e. "current battery>=required battery," battery manager 150 may continue to test additional battery states 510 associated with the current warning interval 520. For example, battery manager 150 may test for the condition "current battery<20%+required battery." If such a condition is true (step 360), battery manager 150 may display a popup warning such as, for example, "Meeting X is scheduled for 12:00 PM. Please charge the device or conserve battery function in order to ensure full functionality."

It will be appreciated by one of skill in the art that estimated battery performance may not always be an indicator of actual performance. Actual battery performance may be a function of various factors including, for example, battery age, prior usage patterns and resource demands specific to a given scheduled event. Accordingly, even if process 300 may enable a user to begin a scheduled event with the requisite estimate of battery charge, it may be possible that in actual use, more power than anticipated may be necessary to support the scheduled event. It may therefore be beneficial to monitor battery usage during the scheduled event as well.

Figure 6:
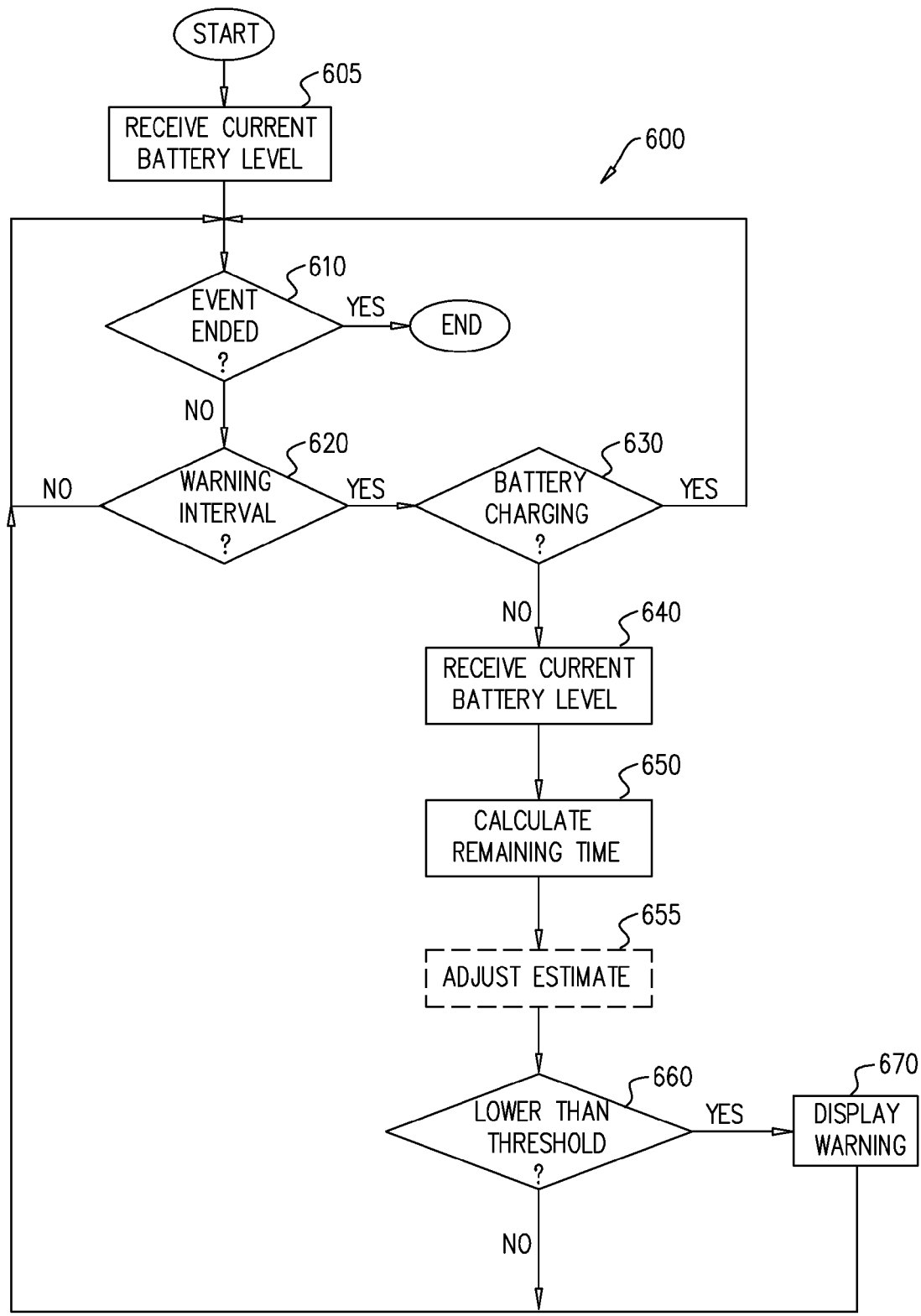
FIG. 6 is a block diagram of an in-use battery consumption monitoring process to be performed on the computing device of FIG. 2.

Reference is now made to FIG. 6 which illustrates an in-use battery consumption monitoring process 600, constructed and operative in accordance with embodiments of the present invention. Process 600 may monitor in use battery consumption in accordance with a schedule of warning intervals during the scheduled event itself. For example, process 600 may be configured to check the level of battery 140 every ten or fifteen minutes while a scheduled event in progress. Process 600 may be performed generally in parallel with the scheduled event. Battery manager 150 may receive (step 605) the current battery level for battery 140 as described hereinabove with respect to step 350 of process 300.

Process 600 may execute in a closed loop until the scheduled event ends (step 610). When a warning interval occurs (step 620), battery manager 150 may use a known API to check whether battery 140 is currently charging (step 630). For example, for Android devices, a suitable API may be found at: http://developer.android.com/training/monitoring-device-state/battery-monitoring.html. A suitable API for iOS devices may be found at: https://developer.apple.com/library/ios/documentation/uikit/reference/UIDevice_C lass/Reference/UIDevice.html. If battery 140 is charging, control may return to step 610. Otherwise, battery manager 150 may receive (step 640) the current battery level for battery 140 as described hereinabove.

Battery manager 150 may calculate (step 650) the battery charge level required for the remainder of the scheduled event, using any suitable methods such as those described hereinabove with regard to tables 400 and 500. Based on the results of step 650, battery manager 150 may adjust (step 655) the estimate for the remainder of the scheduled event if necessary. For example, in accordance with an exemplary embodiment, a 25% charge may have been received in step 605 as the current battery level at the beginning of an event scheduled to last one hour and estimated to require 20% battery charge. Assuming the estimate was accurate, it may be expected that the current battery level as received in step 640 may generally decrease by about 5% every fifteen minutes. However, if after fifteen minutes the battery level as received in step 640 may have been decreased by 10%, battery manager 150 may adjust (step 655) the estimate accordingly, i.e. instead of 20% for one hour, it may be 40%.

If the current battery level is lower than the current estimate (step 660), battery manager 150 may display (step 670) a warning notification in a manner generally similar to that used in step 370 of process 300. It will be appreciated that the performance of step 660 may be performed independently of whether or not the current estimate was adjusted in step 355. Accordingly, even if no adjustment was necessary, process 600 may still provide monitoring functionality if there was insufficient battery charge when the scheduled event began.

Control may then return to step 610 and proceed accordingly until the scheduled event ends (step 610).

Figure 7:
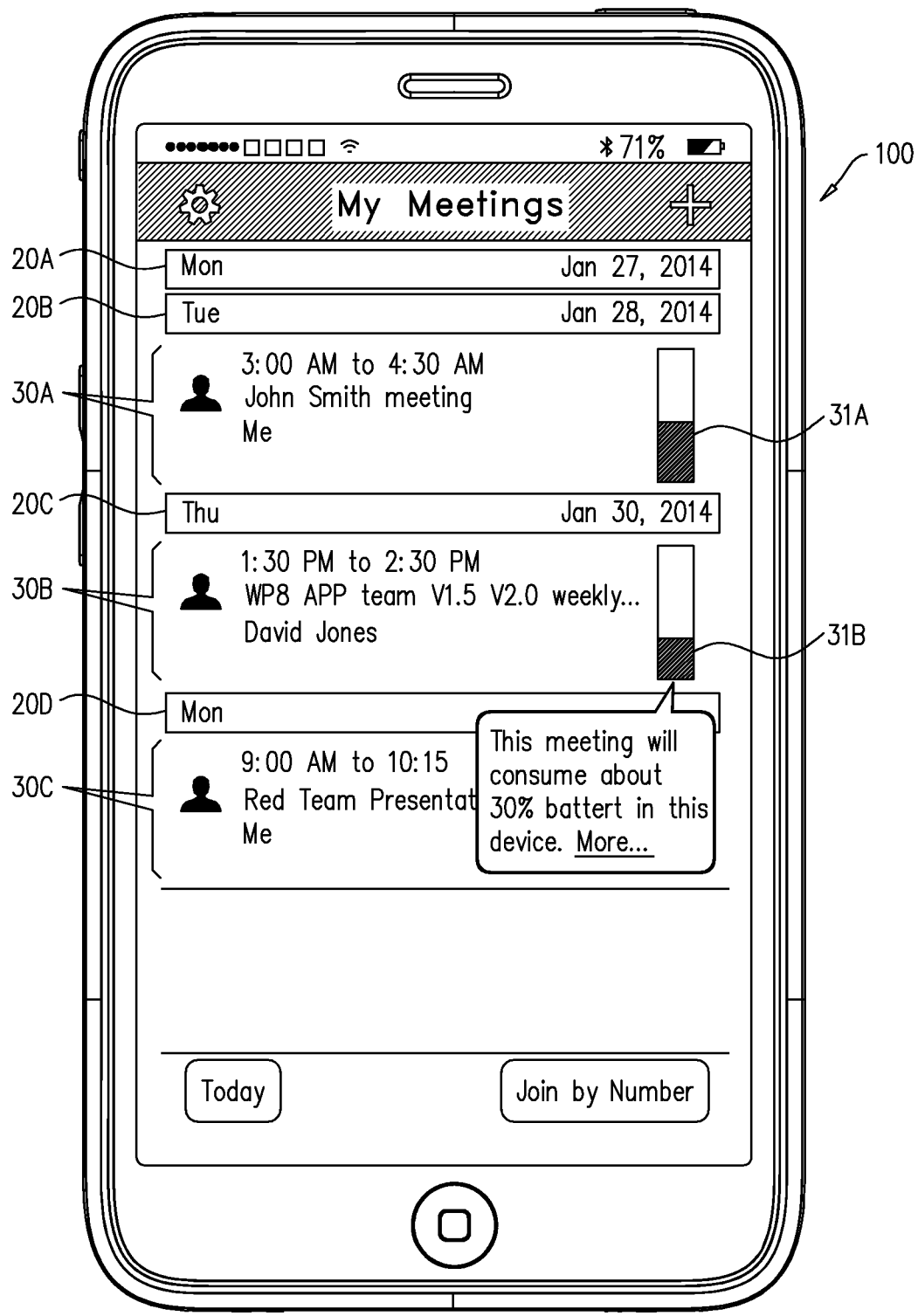
FIG. 7 is a simplified pictorial illustration of a mobile computing device, constructed and operative in accordance with embodiments of the present invention.

It will be appreciated that the representation of battery estimates 31 in FIGS. 1A and 1B as text may be exemplary; the present invention may support other representations as well. For example, as shown in FIG. 7, to which reference is now made, battery estimates 31 may also be represented as graphic illustrations with shading used to indicate required battery charges. It will be appreciated that the present invention may support any other suitable representation as well.

The present invention may also support combined estimates for multiple scheduled events. For example, if two events are scheduled in close proximity to each other, battery states 510 in table 500 may be defined to address the estimated battery charge for both scheduled events.

The present invention may also support battery monitoring for non-scheduled events. For example, if a user joins an ad hoc video conference there may be no scheduled start/stop times from which to derive an expected length of the event. A user may in fact begin any task on device 100, e.g. word processing, Internet surfing, media playing. Battery manager 150 may be configured to track actual battery usage during such unscheduled events and provide warnings regarding how long the current battery charge may last based on either observed usage, such as for example in table 400, and/or actual usage during the unscheduled event. It will be appreciated by one of skill in the art that in this context task applications 160 may not be limited only to the performance of scheduled tasks.

The present invention may also support estimates for different participation roles in scheduled events. For example, the host of a video conference may use more power during the video conference than a passive participant. In accordance with embodiments of the present invention, table 400 may be configured to differentiate between usage observations based on such participation roles. Table 500 may be similarly configured to include participation role as a factor to be considered when evaluating battery states 510. Battery manager 150 may accordingly take the participation type into consideration when calculating an estimate for a scheduled event. It will be appreciated that scheduler 170 may be configured to differentiate between at least some types of participation. For example, commonly available schedulers 170 generally differentiate between a host and an invitee of a meeting.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for battery monitoring on a computing device, the method comprising:
    estimating an event battery consumption estimate for a user scheduled event on said computing device;
    estimating a pre-event consumption estimate for expected battery usage prior to a start of said user scheduled event;
    checking a battery charge level according to a schedule of time intervals preceding a start of said user scheduled event;
    determining according to a set of battery notification rules whether or not to provide a battery warning notification on said computing device, wherein said determining is based at least on said event battery consumption estimate, said pre-event battery consumption estimate, said time intervals, and said battery charge level according to said checking; and
    providing said battery warning notification if required in accordance with said determining.

2. The method according to claim 1 and also comprising:
    providing an indication of said first battery consumption estimate as part of a display of user scheduled events on said computing device.

3. The method according to claim 1 and wherein each of said set of battery notification rules comprises:
    a battery state to be assessed at least according to said battery charge level;
    a time interval to be used in combination with a scheduled time for said user scheduled event to determine when said battery state is to be assessed; and
    a battery warning notification to be provided if required in accordance with results of an assessment of said battery state.

4. A method according to claim 1 and also comprising:
    checking said battery charge level during said user scheduled event, wherein said determining is additionally based on said checking a battery charge level during said scheduled event.

5. The method according to claim 4 and also comprising adjusting said event battery consumption estimate, wherein said adjusting comprises:
    calculating actual battery consumption during said user scheduled event;
    estimating a new event battery consumption estimate for a remainder of said user scheduled event in view of said actual battery consumption; and
    replacing said event battery consumption estimate with said new event battery consumption estimate.

6. The method according to claim 1 and wherein said estimating an event battery consumption estimate comprises:
    storing observations of said actual battery consumption; and
    estimating said event battery consumption estimate based at least in part on said stored observations.

7. The method according to claim 1 and wherein said estimating comprises:
    observing actual battery usage by similar devices similar to said computing device when participating in tasks similar to said user scheduled event.

8. The method according to claim 1 and wherein said estimating comprises:
    observing actual battery usage by said computing device when participating in tasks similar to tasks performed as part of said user scheduled event.

9. The method according to claim 1 and wherein said determining is also based on a battery requirement for operating said computing device until said user scheduled event.

10. The method according to claim 9 and wherein said battery requirement for operating is based on at least one said event battery consumption estimate estimated for another user scheduled event.

11. The method according to claim 1 and wherein said estimating is based at least on a participation role in said user scheduled event for a user of said computing device.

12. A computing device comprising:
    a battery operative to provide current battery charge levels at least according to a schedule of time intervals;
    a processor; and
    a battery manager configured to be run by said processor and configured to:
        estimate event battery consumption estimates for user scheduled applications run by said processor,
        estimate pre-event battery consumption estimates for said battery prior to a schedule start for said user scheduled applications, and
        based on said current battery charge levels, said event battery consumption estimates, and said pre-event battery consumption estimates, determine whether or not to provide battery warning notifications on said computing device; and
    a screen display operative to display said battery warning notifications.

13. A computing device according to claim 12 and also comprising a scheduler to be run by said processor, wherein:
    said scheduler is operative to schedule execution of said user scheduled applications as user scheduled events; and
    said battery warning notifications are associated with said user scheduled events.

* * * * *